(12) United States Patent
Deng et al.

(10) Patent No.: US 11,598,886 B2
(45) Date of Patent: Mar. 7, 2023

(54) GNSS/IMU SURVEYING AND MAPPING SYSTEM AND METHOD

(71) Applicant: Shanghai Huace Navigation Technology LTD., Shanghai (CN)

(72) Inventors: Haifeng Deng, Shanghai (CN); Benyin Yuan, Shanghai (CN); Xuefeng Shen, Shanghai (CN)

(73) Assignee: Shanghai Huace Navigation Technology LTD., Shanghai (CN)

( * ) Notice: Subject to any disclaimer, the term of this patent is extended or adjusted under 35 U.S.C. 154(b) by 163 days.

(21) Appl. No.: 17/257,021

(22) PCT Filed: Dec. 24, 2019

(86) PCT No.: PCT/CN2019/127824
§ 371 (c)(1),
(2) Date: Dec. 30, 2020

(87) PCT Pub. No.: WO2021/127968
PCT Pub. Date: Jul. 1, 2021

(65) Prior Publication Data
US 2021/0364654 A1  Nov. 25, 2021

(30) Foreign Application Priority Data
Dec. 23, 2019 (CN) .......................... 201911334887.7

(51) Int. Cl.
*G01S 19/49* (2010.01)
*G01S 19/51* (2010.01)
(Continued)

(52) U.S. Cl.
CPC .............. *G01S 19/49* (2013.01); *G01C 15/06* (2013.01); *G01S 19/14* (2013.01)

(58) Field of Classification Search
CPC .......... G01S 19/49; G01S 19/51; G01S 19/14; G01C 15/06; G01C 17/00; G01C 17/10
(Continued)

(56) References Cited

U.S. PATENT DOCUMENTS

2009/0024325 A1  1/2009 Scherzinger

FOREIGN PATENT DOCUMENTS

| CA | 2984404 A1 * | 6/2018 | ............. G01C 11/02 |
| CN | 109269471 A | 1/2019 | |

(Continued)

OTHER PUBLICATIONS

Leo Mercy, GPS Surveying at CPCC's Mojave Cement Plant: Real-Time Kinetic Surveying—Generating Real-Time Savings, For Presentation at the IEEE-IAS/PCA 43rd Cement Industry Technical Conference, 2001, pp. 411-419, IEEE.

*Primary Examiner* — Harry K Liu
(74) *Attorney, Agent, or Firm* — Bayramoglu Law Offices LLC

(57) ABSTRACT

A GNSS/IMU-based tilt measurement system includes a GNSS/IMU receiver. The GNSS/IMU receiver includes a GNSS antenna, a GNSS positioning board, an IMU inertial sensor and a position transfer device. The GNSS antenna is configured to receive a satellite navigation positioning signal. The GNSS positioning board is configured to calculate coordinates of the phase center of the GNSS antenna according to a signal received by the GNSS antenna and use the coordinates of the phase center as reference coordinates for measuring a relative position point. The IMU inertial sensor is configured to measure the acceleration and the angular velocity of the receiver. The relative position transfer medium is configured to connect the reference coordinates and the coordinates of the relative position point to be measured. The position transfer device is configured to (Continued)

implement the measurement function of the relative position point.

16 Claims, 5 Drawing Sheets

(51) Int. Cl.
*G01C 15/06* (2006.01)
*G01S 19/14* (2010.01)

(58) Field of Classification Search
USPC .................................................. 342/357.32
See application file for complete search history.

(56) References Cited

FOREIGN PATENT DOCUMENTS

| | | | | | |
|---|---|---|---|---|---|
| CN | 110017849 | A | * 7/2019 | ............ | G01C 15/06 |
| CN | 110017849 | A | 7/2019 | | |
| EP | 1503176 | A2 | 2/2005 | | |
| EP | 3397923 | A1 | 11/2018 | | |
| EP | 3569977 | A1 | * 11/2019 | ............ | G01C 11/02 |
| WO | WO-2014060429 | A1 | * 4/2014 | ............ | G01C 15/06 |

* cited by examiner

Complete the rough stakeout: make the vertical tilt angle of the centering rod smaller than 10°, then the user again moves the bottom tip of the centering rod to enable the distance to be staked out to meet the stakeout index.

GNSS/IMU SURVEYING AND MAPPING SYSTEM AND METHOD

CROSS REFERENCE TO THE RELATED APPLICATIONS

This application is the national phase entry of International Application No. PCT/CN2019/127824, filed on Dec. 24, 2019, which is based upon and claims priority to Chinese Patent Application No. 201911334887.7, filed on Dec. 23, 2019, the entire contents of which are incorporated herein by reference.

TECHNICAL FIELD

The present invention relates to a high-precision global navigation satellite system (GNSS)/inertial measurement unit (IMU) receiver system and a measurement method thereof. The present invention utilizes a GNSS receiver to perform point measurement and stakeout when applied in engineering surveying, monitoring and other surveying fields, and utilizes the GNSS receiver or a GNSS/INS integrated navigation device to perform navigation positioning when applied in vehicles, aircraft, ships and other navigation positioning fields.

BACKGROUND

A GNSS receiver generally includes a GNSS antenna and a GNSS positioning board. The GNSS positioning board calculates the position of the phase center of the GNSS antenna according to a GNSS satellite positioning signal received by the GNSS antenna. However, the phase center of the GNSS antenna is located inside the GNSS receiver, while the point to be measured is located outside the GNSS receiver. In this regard, it is required to transfer the position of the phase center of the GNSS antenna inside the GNSS receiver to the point to be measured outside the GNSS receiver to realize the measurement of the point to be measured.

The traditional surveying and mapping method uses a centering rod or a tripod to transfer the phase center of the GNSS antenna inside the GNSS receiver to the position of the point to be measured outside the GNSS receiver. During the structural design of the GNSS receiver, the geometric center of the GNSS antenna and the installation center of the housing of the GNSS receiver are arranged coaxially to establish the communication between the phase center of the GNSS antenna and the outside. Additionally, the deviation of the phase center of the GNSS antenna relative to the external installation center is calibrated as leaving the factory. During an actual measurement, the GNSS receiver is installed on the centering rod, the bottom tip of the centering rod is placed on the point to be measured, and the leveling bubble on the centering rod is maintained to be centered, so that the geometric center of the GNSS antenna, the installation center and the point to be measured are arranged coaxially to share a common axis that is parallel to the plumb line, thereby transferring the phase center of the GNSS antenna to the measurement point to facilitate the measurement of the measurement point. As shown in FIG. 1A and FIG. 1B, x, y, and h are factory calibration values.

In the traditional operation mode, the GNSS receiver needs to be centered and leveled, and the GNSS receiver is maintained to be parallel to the local horizontal plane, so that the position of the phase center of the GNSS antenna is transferred to the measurement point, which is to measure the relative position point in essence. As a result, operation efficiency is low, and it is labor intensive. Moreover, wall corners, slopes and other similar obstructions make it difficult to measure directly. In order to improve operation efficiency and reduce labor intensity, some companies in the industry have developed a tilt measurement scheme. The tilt measurement is one implementation of the measurement of the relative position point and is typically accomplished by two methods: a magnetic tilt measurement method based on attitude and heading reference system (AHRS) technology, and a multi-position measurement method based on a space intersection theory.

The AHRS-based magnetic tilt measurement method includes: calculating the three-dimensional attitude of the GNSS receiver through an AHRS algorithm, that is, tracking the pitch angle and the roll angle of the GNSS receiver by using an accelerometer or a combination of the accelerometer and a gyroscope, and tracking the heading angle of the GNSS receiver by using a magnetometer; generating a direction cosine matrix by jointly using the pitch angle, the roll angle and the heading angle to realize the coordinate conversion of the space vector, and compensating the position of the phase center of the GNSS antenna to the ground measurement point. However, this method has at least the following disadvantages:

1. Since the absolute tracking accuracy of the pitch angle and the roll angle of the GNSS receiver depends on the measurement accuracy of the accelerometer, it is necessary to calibrate the zero-offset of the accelerometer regularly. The calibration accuracy directly affects the tracking accuracy of the pitch angle and the roll angle of the GNSS receiver, and customers generally do not have the professional knowledge and equipment conditions for calibrating the accelerometer.

2. A premise for tracking the pitch angle and the roll angle of the GNSS receiver by the accelerometer is that the accelerometer is only sensitive to gravity. In this regard, this method can only be used under the quasi static condition, but has unreliable accuracy of angle tracking when used under the dynamic condition. Even if the gyroscope is adopted, it only improves the dynamics of the angle tracking and achieves the effect of smooth angle tracking. Under the long-term dynamic condition, the absolute accuracy of the angle tracking still depends on the accuracy of the accelerometer.

3. A change in the electromagnetic environment directly affects the measurement output of the magnetometer. Thus, it is required to calibrate the magnetometer regularly. Optimally, the magnetometer is calibrated every time the equipment is activated. The calibration effect of system deviation of the magnetometer directly affects the measurement accuracy of the heading angle, thereby affecting the accuracy of the tilt measurement. Moreover, it is difficult to monitor the changes in the electromagnetic environments inside and outside the GNSS receiver during use. Therefore, this method has poor reliability.

The aforementioned magnetic tilt measurement method cannot ensure accuracy, has poor reliability, poor repeatability, and involves a complicated calibration process, and therefore, has poor practicality.

The multi-position measurement method based on the space intersection theory includes: fixedly placing the bottom tip of the centering rod on a known point, moving the centering rod to acquire the coordinates of the GNSS receiver at multiple positions, taking the length of the centering rod as a constraint for spatial intersection to determine the position of the bottom tip of the centering rod.

However, the measurement accuracy of this method is restricted by the geometric structure of the spatial distribution of the acquisition points of the GNSS receiver at multiple positions. For example, the GNSS receiver has limited movement space under obstructive environments, such as a wall corner. Therefore, this method has a poor geometric structure of the acquisition points at the multiple positions, and has unsatisfactory measurement accuracy that only reaches the decimeter level. Moreover, the centering rod needs to be moved multiple times to acquire the coordinates at the multiple positions to complete the measurement, which is inefficient.

SUMMARY

In view of the above-mentioned problems, an object of the present invention is to provide a new GNSS/IMU receiver measurement system and method to achieve reliable and high-precision measurement of the relative position point, so as to replace the traditional GNSS measurement method and the tilt measurement method based on the AHRS technology or the space intersection technology. The present invention improves the operation efficiency of the GNSS receiver for fieldwork measurement, reduces the labor intensity for the user, and broadens the application of the GNSS receiver in the fields of digital construction, precision agriculture, intelligent driving and the like.

To achieve the above-mentioned objects, the present invention provides the following technical solutions. A GNSS/IMU-based tilt measurement system includes a GNSS/IMU receiver, a relative position transfer medium and a display terminal. The GNSS/IMU receiver includes a GNSS antenna, a GNSS positioning board, an IMU inertial sensor and a position transfer device. The GNSS antenna is configured to receive a satellite navigation positioning signal. The GNSS positioning board is configured to calculate coordinates of the phase center of the GNSS antenna according to a signal received by the GNSS antenna, and use the coordinates as reference coordinates for measuring a relative position point. The IMU inertial sensor is configured to measure the acceleration and the angular velocity of the receiver. The position transfer device is configured to calculate three-dimensional coordinates, a tilt angle and a measurement state of the relative position point of the receiver and transfer the measurement state back through sound or light.

The relative position transfer medium is a physical medium configured to transfer the defined spatial relation between the relative position point to be measured and the phase center of the antenna of the GNSS/IMU receiver.

The display terminal is configured to display the measurement result and the measurement state of the relative position point of the GNSS/IMU receiver and interact with a user.

The surveying and mapping system has the following features.

The GNSS/IMU receiver includes an IMU inertial sensor, and the IMU inertial sensor is installed inside the GNSS/IMU receiver according to the defined spatial relation. The IMU inertial sensor includes an accelerometer and a gyroscope.

The GNSS/IMU surveying and mapping system includes a relative position transfer medium. The relative position transfer medium is a physical medium configured to transfer the defined spatial relation, and can be abstracted into a three-dimensional coordinate vector to represent a coordinate vector of the relative position point to be measured in a Cartesian coordinate system with the origin in the phase center of the GNSS antenna.

The GNSS/IMU receiver includes a position transfer device. The position transfer device is configured to process the reference position calculated by the GNSS board, the observation data of the IMU sensor and the data of the relative position transfer medium, and calculate the coordinates of the relative position point, the tilt angle and the measurement state of the receiver.

The GNSS/IMU surveying and mapping system includes a display terminal. The display terminal is configured to interact with the user and display the measurement result and the measurement state of the relative position point output by the position transfer device. The display terminal is an optional device of the GNSS/IMU surveying and mapping system, and does not affect the implementation of the measurement function of the relative position point of the GNSS/IMU surveying and mapping system.

Preferably, the IMU inertial sensor is constructed in the form of a micro electro mechanical system (MEMS) and at least includes a three-axis MEMS accelerometer and a three-axis MEMS gyroscope. The three axes of the accelerometer are arranged correspondingly parallel to the three axes of the gyroscope. The IMU inertial sensor employs the industrial-grade or low-accuracy accelerometer and gyroscope.

Preferably, the IMU inertial sensor is installed inside the GNSS/IMU receiver according to a defined spatial relation in the following manner: the IMU inertial sensor is fixed on the structural support inside the receiver, and power supply and data transmission are realized by a pin header or cable; alternatively, the IMU inertial sensor is fixed on the PCB in a pasting manner, and power supply and data transmission are realized by designing a circuit of the PCB.

Preferably, the relative position transfer medium is a three-dimensional vector in a Cartesian coordinate system with the origin in the phase center of the GNSS antenna, wherein the definition of directions of the coordinate axes of the Cartesian coordinate system is the same as the definition of directions of the coordinate axes of the accelerometer and the gyroscope of the IMU inertial sensor, and the Cartesian coordinate system is defined as a body coordinate system. The relative position transfer medium indicates the projection coordinates of the space vector of the relative position point to be measured relative to the phase center of the GNSS antenna in the body coordinate system.

Preferably, the relative position transfer medium is a physical medium, wherein the physical medium is one selected from the group consisting of a centering rod, a tripod, an automated guided vehicle (AGV), an unmanned aerial vehicle, an unmanned surface vehicle, a ferry vehicle, a tractor, a transplanter, a planter, a harvester, a bulldozer, a land leveller, an excavator, a paver, a road roller, a loader, a crane, a drilling machine, a forklift truck, a snow removal vehicle, a sprinkler truck, a sanitation truck and a fire engine.

Preferably, since the user cannot directly contact the phase center of the GNSS antenna located inside the GNSS/IMU receiver, the phase center of the GNSS antenna needs to connect to an external point of the GNSS/IMU receiver. Therefore, the relative position transfer medium is a three-dimensional vector that at least includes a first three-dimensional vector and a second three-dimensional vector. The three-dimensional coordinate vector of the space vector of the external connection point relative to the phase center of the GNSS antenna in the body coordinate system is defined as the first three-dimensional vector, and the first three-dimensional vector is a constant value and stored in a memory of the GNSS/IMU receiver. After the origin of the body coordinate system is translated to the external connection point, a new coordinate system is obtained and defined as a connection coordinate system. The three-dimensional coordinate vector of the space vector of the relative position point to be measured relative to the external connection point of the GNSS/IMU receiver in the connection coordinate system is defined as the second three-dimensional vector, and the second three-dimensional vector is set by the user. The three-dimensional vector defined by the relative position transfer medium is a position transfer vector determined by the geometric relation between the first three-dimensional vector and the second three-dimensional vector, such as translation, addition/subtraction or trigonometric function calculation. The installation surface center of the GNSS/IMU receiver is one implementation of the external connection point of the receiver, and the connection point may be any one contactable point that is located on the exterior of the receiver and fixed relative to the receiver.

Preferably, the position transfer device is configured to acquire the navigation positioning data of the GNSS board and the observation data of the IMU, calculate the pitch angle (±90°), the roll angle (±180°) and the heading angle (±180°/0-360°) of the GNSS/IMU receiver through a GNSS/INS integrated navigation algorithm, use the pitch angle, the roll angle and the heading angle as a reference three-dimensional attitude, calculate the three-dimensional coordinates of the relative position point to be measured through the reference coordinates, the reference three-dimensional attitude and the position transfer vector, calculate the tilt angle of the GNSS/IMU receiver relative to the local horizontal coordinate system through the reference three-dimensional attitude, output the reference coordinates, the reference three-dimensional attitude, the position transfer vector, the coordinates of the relative position point, the tilt angle, and the related state of the measurement function of the relative position point, and transfer back the measurement result and the related state of the relative position point in the form of sound or light. The coordinates of the relative position point, the tilt angle, and the related state of the measurement function of the relative position point are the required output, and the remaining data are the optional output.

The reference three-dimensional attitude of the GNSS/IMU receiver is defined according to the coordinate axis system defined by the IMU, and is used to represent the rotation angle of the GNSS/IMU receiver relative to the navigation coordinate system around the IMU coordinate axis system.

The tilt angle of the GNSS/IMU receiver relative to the local horizontal coordinate system includes a vertical tilt angle and a directional tilt angle. According to the definition of the coordinate axes defined by the IMU, the vertical tilt angle represents an angle (0-180°) between the Z axis of the IMU and the plumb line, wherein the Z axis generally refers to the direction in which the middle finger points in the right-handed coordinate system, and the directional tilt angle represents an angle (±180°) between a plane and the true north direction, wherein the plane is formed by the Z axis of the IMU and the plumb line.

The present invention further provides a surveying and mapping method by using a centering rod to implement the measurement function of the relative position point. The surveying and mapping method at least includes an initialization process of the measurement function of the relative position point and a measurement process of the relative position point.

The initialization process of the measurement function of the relative position point at least includes: step 1: setting the three-dimensional projection vector of the space vector of the relative measurement point relative to the external connection point in the connection coordinate system, wherein, in the surveying and mapping method, the installation surface center of the receiver is selected as the external connection point, then the three-dimensional projection vector is the three-dimensional projection coordinates of the vector length from the top center of the centering rod to the bottom tip of the centering rod in the connection coordinate system; and step 2: initializing the reference attitude through a specific operation action to obtain the initial attitude value of a GNS SANS integrated navigation algorithm, and performing a GNS SANS integrated navigation filtering calculation. The order of step 1 and step 2 can be reversed.

The measurement process of the relative position point at least includes step 1: placing the bottom tip of the centering rod on a point to be measured to connect the relative position point and the point to be measured; and step 2: acquiring the three-dimensional coordinates of the relative position point output by the position transfer device.

Preferably, the specific operation action for the initialization of the reference attitude includes the following types:

(1) after the measurement function of the relative position point is turned on, the centering rod maintains in-situ motionless for a period of time, and then is repeatedly shaken backward-and-forward until the GNSS/IMU receiver or the display terminal prompts, in the form of sound or light, that the initialization process is completed;

(2) after the measurement function of the relative position point is turned on, the centering rod maintains in-situ motionless for a period of time, and then is repeatedly shaken left-and-right until the GNSS/IMU receiver or the display terminal prompts, in the form of sound or light, that the initialization process is completed;

(3) after the measurement function of the relative position point is turned on, the centering rod maintains in-situ motionless for a period of time, and then is repeatedly shaken backward-forward-and-left-right until the GNSS/IMU receiver or the display terminal prompts, in the form of sound or light, that the initialization process is completed;

(4) after the measurement function of the relative position point is turned on, the centering rod maintains in-situ motionless for a period of time, and then is driven to repeatedly perform a clockwise circular motion until the GNSS/IMU receiver or the display terminal prompts, in the form of sound or light, that the initialization process is completed;

(5) after the measurement function of the relative position point is turned on, the centering rod maintains in-situ motionless for a period of time, and then is driven to repeatedly perform a counterclockwise circular motion until the GNSS/IMU receiver or the display terminal prompts, in the form of sound or light, that the initialization process is completed;

(6) after the measurement function of the relative position point is turned on, the centering rod is held by hand or carried on the shoulder and moved a specific distance, and then is repeatedly shaken backward-and-forward until the GNSS/IMU receiver or the display terminal prompts, in the form of sound or light, that the initialization process is completed;

(7) after the measurement function of the relative position point is turned on, the centering rod is held by hand or carried on the shoulder and moved a specific distance, and then is repeatedly shaken left-and-right until the GNSS/IMU receiver or the display terminal prompts, in the form of sound or light, that the initialization process is completed;

(8) after the measurement function of the relative position point is turned on, the centering rod is held by hand or carried on the shoulder and moved a specific distance, and then is repeatedly shaken backward-forward-and-left-right until the GNSS/IMU receiver or the display terminal prompts, in the form of sound or light, that the initialization process is completed;

(9) after the measurement function of the relative position point is turned on, the centering rod is held by hand or carried on the shoulder and moved a specific distance, and then is driven to repeatedly perform a clockwise circular motion until the GNSS/IMU receiver or the display terminal prompts, in the form of sound or light, that the initialization process is completed; and

(10) after the measurement function of the relative position point is turned on, the centering rod is held by hand or carried on the shoulder and moved a specific distance, and then is driven to repeatedly perform a counterclockwise circular motion until the GNSS/IMU receiver or the display terminal prompts, in the form of sound or light, that the initialization process is completed.

The operations of shaking the centering rod are any combination of backward-and-forward shaking, left-and-right shaking and circular motion. The motionless time is set to 1-5 seconds, the movement distance is set to 1-10 meters, and the number of repeated shaking operations and circular motions is set to 1-10. The length of the motionless time, the length of the movement distance, the order of performing a combination of shaking operations and the number of the repeated shaking operations do not affect the implementation of the initialization process.

Preferably, in the measurement process, the user holds the centering rod by hand or carries the centering rod on the shoulder, and puts the bottom tip of the centering rod on the point to be measured, and the range of the vertical tilt angle of the GNSS/IMU receiver is maintained to be 0-90°. Different from the traditional surveying and mapping method by using a centering rod to implement the measurement function. The method of the present invention eliminates the process of keeping the leveling bubble on the centering rod centered since it does not require the vertical tilt angle of the receiver to be 0° or approach 0°.

Preferably, the three-dimensional coordinates of the relative measurement point are acquired by the following methods.

Single position and single acquisition: after the user issues an acquisition command through button or sound, the display terminal or the receiver saves the three-dimensional coordinates of the first relative measurement point, and takes the three-dimensional coordinates of the first relative measurement point as the measurement result, wherein the three-dimensional coordinates of the first relative measurement point are output by the position transfer device after receiving the command.

Single position and multiple acquisition: after the user issues the acquisition command through button or sound, the display terminal or the receiver saves the three-dimensional coordinates of multiple consecutive relative measurement points and takes the average of the three-dimensional coordinates of the multiple consecutive relative measurement points as the measurement result, wherein the three-dimensional coordinates of the multiple consecutive relative measurement points are output by the position transfer device after receiving the command.

Multiple positions and single acquisition: after the user issues the acquisition command through button or sound, the display terminal or the receiver saves the three-dimensional coordinates of the first relative measurement point, and takes the three-dimensional coordinates of the first relative measurement point as the measurement value of a first position, wherein the three-dimensional coordinates of the first relative measurement point are output by the position transfer device after receiving the command. The bottom tip of the centering rod is maintained to be placed on the point to be measured, and the centering rod is moved to a second position. After the user again issues the acquisition command through button or sound, the display terminal or the receiver saves the three-dimensional coordinates of the first relative measurement point, and takes the three-dimensional coordinates of the first relative measurement point as the measurement value of the second position, wherein the three-dimensional coordinates of the first relative measurement point are output by the position transfer device after receiving the command. The above operations are repeatedly performed to acquire the measurement values of multiple positions, and an average of the measurement values is taken as the measurement result.

Multiple positions and multiple acquisition: after the user issues the acquisition command through button or sound, the display terminal or the receiver saves the three-dimensional coordinates of the multiple consecutive relative measurement points and takes the average of the three-dimensional coordinates of the multiple consecutive relative measurement points as the measurement value of the first position, wherein the three-dimensional coordinates of the multiple consecutive relative measurement points are output by the position transfer device after receiving the command. The bottom tip of the centering rod is maintained to be placed on the point to be measured, and the centering rod is moved to a second position. After the user again issues the acquisition command through button or sound, the display terminal or the receiver saves the three-dimensional coordinates of the multiple consecutive relative measurement points and takes the average of the three-dimensional coordinates of the multiple consecutive relative measurement points as the measurement value of the second position, wherein the three-dimensional coordinates of the multiple consecutive relative measurement points are output by the position transfer device after receiving the command. The above operations are repeatedly performed to acquire the measurement values of multiple positions, and the average of the measurement values is taken as the measurement result.

During the measurement of the single position and the measurement of the multiple positions, the state of the centering rod is only required to meet the condition that the relative position point to be measured is a bottom tip of the centering rod. The number of the acquisition points during the multiple acquisition and the number of times the centering rod is moved during the measurement of the multiple positions do not affect the implementation of the data acquisition process.

During the measurement of the multiple positions, the bottom tip of the centering rod is allowed to deviate from the point to be measured in the process of switching the position of the centering rod, and the bottom tip of the centering rod is placed at the identical point to be measured in the process of triggering the acquisition command and the process of acquiring the data.

The present invention further provides a surveying and mapping method for implementing a stakeout function by using the measurement function of the relative position point. The method includes the following steps:

acquisition of measurement information of the relative position point: receiving, by the display terminal in real time, three-dimensional coordinate information of the relative position point of the bottom tip of the centering rod and tilt angle information of the GNSS/IMU receiver output by the position transfer device;

calculation of the distance to be staked out: calculating a three-dimensional coordinate vector between the bottom tip of the centering rod and a point to be staked out through the display terminal according to position information of the bottom tip of the centering rod and position information of the point to be staked out received in real time, and projecting the three-dimensional coordinate vector on the local horizontal coordinate system, wherein the sum of the vectors of the projection coordinates of the three-dimensional coordinate vector on the horizontal plane is a horizontal distance to be staked out, the projection coordinates of the three-dimensional coordinate vector in the elevation direction indicate an elevation distance to be staked out, and the horizontal distance to be staked out and the elevation distance to be staked out jointly constitute the distance to be staked out;

calculation of a direction to be staked out: calculating the three-dimensional coordinate vector between the bottom tip of the centering rod and the point to be staked out through the display terminal according to the position information of the bottom tip of the centering rod and the position information of the point to be staked out received in real time, calculating an angle between the three-dimensional coordinate vector and the true north direction, defining the angle as a first direction angle, and defining the directional tilt angle of the GNSS/IMU receiver that is output by the position transfer device and received by the display terminal in real time as the second direction angle; wherein a difference between the first direction angle and the second direction angle indicates the direction to be staked out;

stakeout guidance: prompting the distance to be staked out and the direction to be staked out by the display terminal through a display or sound, wherein the user performs a stakeout operation as prompted, and the stakeout operation includes a point finding process and a stakeout process; and implementation of stakeout: when the horizontal distance to be staked out and the elevation distance to be staked out as prompted by the display terminal both meet the stakeout accuracy index requirement, determining the position where the bottom tip of the centering rod is located as the position of the point to be staked out.

Specifically, the stakeout operation is described as follows.

The stakeout operation includes the point finding process and the stakeout process according to the horizontal distance to be staked out as prompted by the display terminal. When the horizontal distance to be staked out as prompted by the display terminal is larger than a stakeout distance threshold, the point finding process is performed. When the horizontal distance to be staked out as prompted by the display terminal is smaller than the stakeout distance threshold, the stakeout process is performed. The stakeout distance threshold is an empirical reference value only for the user to distinguish the point finding process and the stakeout process, and is preferably 0.3 m.

The point finding process is as follows: the user holds the centering rod by hand or carries the centering rod on the shoulder, and the range of the vertical tilt angle of the GNSS/IMU receiver is maintained to be 0-90°, and then the user moves along the direction to be staked out as prompted by the display terminal to decrease the horizontal distance to be staked out as prompted by the display terminal until the horizontal distance to be staked out as prompted by the display terminal is smaller than the stakeout distance threshold to enter the stakeout process.

The stakeout process includes a rough stakeout process and a fine stakeout process according to the stakeout accuracy requirement. The rough stakeout process is as follows: the user holds the centering rod by hand or carries the centering rod on the shoulder and moves the bottom tip of the centering rod along the direction to be staked out as prompted by the display terminal until the horizontal distance to be staked out and the elevation distance to be staked out as prompted by the display terminal both meet the stakeout accuracy requirement. The fine stakeout process is as follows: on the basis of the rough stakeout process, the user keeps the position of the bottom tip of the centering rod unchanged, holds the centering rod by hand or carries the centering rod on the shoulder, and moves the centering rod to make the vertical tilt angle of the GNSS/IMU receiver smaller than 10°, that is, the centering rod is nearly vertical. If the horizontal distance to be staked out and the elevation distance to be staked out as prompted by the display terminal still meet the stakeout accuracy requirement, then the stakeout process is completed. If the horizontal distance to be staked out and the elevation distance to be staked out do not meet the stakeout accuracy requirement, then the centering rod is slightly moved in the direction to be staked out as prompted by the display terminal until the horizontal distance to be staked out and the elevation distance to be staked out meet the stakeout accuracy requirement to complete the stakeout process.

When the stakeout accuracy requirement is high, the fine stakeout process is performed to ensure that the stakeout accuracy meets the requirement. The fine stakeout process does not affect the stakeout function of the GNSS/IMU receiver.

Compared with the prior art, the present invention has the following advantages.

(1) In the present invention, the IMU inertial sensor is integrated inside the traditional GNSS receiver, and the inertial navigation positioning result is combined with the satellite navigation positioning result by a Kalman filter, which makes the respective advantages of the inertial navigation positioning and the satellite navigation positioning complementary to each other. The present invention takes full advantage of the high accuracy of the satellite navigation positioning and the high dynamic and full autonomy of the inertial navigation positioning to realize high-precision and high-reliability dynamic tracking of the three-dimensional attitude of the GNSS/IMU receiver. On this basis, the measurement function of the relative position point of the GNSS/IMU receiver is realized, which eliminates the process of centering the leveling bubble and reduces the labor intensity of the user while greatly improving the measurement efficiency.

(2) The calculated result obtained through the mechanization of the inertial navigation system and the calculated result obtained through the GNSS are integrated by the Kalman filter. The attitude error, the velocity error and the position error produced from the mechanization, and the residual zero-offset error produced from the inertia sensor are estimated and corrected through feedback, thereby accomplishing high-frequency and high-precision dynamic tracking calculation of the three-dimensional attitude. No magnetometer is adopted in the present invention, which fundamentally avoids the problem of poor reliability caused by the correction of the magnetometer and the interference of the electromagnetic environment. Since the motion state is modeled completely, a change in the motion state of the GNSS receiver does not affect the tracking of the three-dimensional attitude. Thus, the present invention can track the three-dimensional attitude with high accuracy and high dynamic, and the relative position point is measured in real time based on the three-dimensional attitude without requiring the quasi static condition.

(3) The present invention fully utilizes the velocity and position information of the GNSS to initialize the states of the loosely coupled GNSS/INS integrated calculation, including the three-dimensional position, the three-dimensional velocity and the three-dimensional attitude. The initial value of the three-dimensional position and the initial value of the three-dimensional velocity can be obtained through the GNSS receiver. The initial value of the pitch angle and the initial value of the roll angle can be obtained through the measurement information of the accelerometer. The key is to obtain the initial value of the heading angle. The initial value of the heading angle of the loosely coupled GNSS/INS integrated calculation is essentially an angle between the coordinate axis of the inertial sensor and the true north direction. The traditional loosely coupled GNSS/INS integrated algorithm model cannot satisfy the linearization condition since the GNSS/IMU receiver is not fixedly installed and the angle between the coordinate axis of the inertial sensor and the true north direction is arbitrary and unfixed at the initial moment. In this regard, in the present invention, the state quantity of the Kalman filter is reconstructed to linearize the nonlinear model (Method For Estimating Initial Heading Of Carrier Based On Transformation Estimator Modeling Scheme, CN 109764870A). In this way, the user only needs to hold the GNSS/IMU receiver and operates it according to specific actions for a specific time, so that the initial value of the heading angle satisfying a small angle error required by the loosely coupled GNSS/INS integrated algorithm model is estimated under the condition of an arbitrary initial value of the heading angle, and then the loosely coupled GNSS/INS integrated calculation is performed to realize the high-precision and high-dynamic tracking of the three-dimensional attitude.

(4) In the present invention, the measurement function of the relative position point is initialized only by a specific operation as follows: the user holds the GNSS/IMU receiver by the hand and keeps the GNSS/IMU receiver motionless for a period of time or moves the GNSS/IMU receiver by a distance, and then shakes the receiver to complete the initialization. This operation action is easy, so that the user can complete it generally within 10 seconds, which hardly affects the normal measurement operation process.

(5) In the present invention, the stakeout function is realized by a specific operation. The traditional stakeout method determines the direction to be staked out based on the magnetometer on the display terminal, which has poor accuracy and reliability. Especially, after arriving near the point to be staked out, due to the spatial inconsistency between the display terminal and the GNSS receiver, the direction to be staked out on the display terminal has no reference significance, which provides a poor experience for the user. In addition, after arriving near the point to be staked out, the leveling bubble on the centering rod is necessarily centered to realize accurate stakeout, which has low efficiency and large labor intensity. In the present invention, the tilt angle of the GNSS/IMU receiver itself is calculated, which has high accuracy and high reliability. After arriving near the point to be staked out, only the bottom tip of the centering rod is moved to complete the stakeout, which is simple and convenient to operate, thereby greatly improving the stakeout efficiency, and reducing the labor intensity of the user.

DETAILED DESCRIPTION OF THE EMBODIMENTS

Figure 1A:
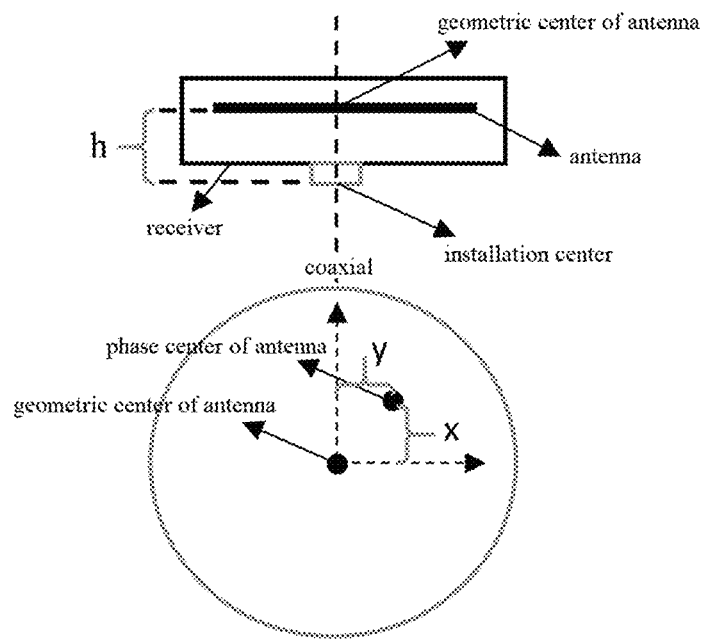
FIG. 1A and FIG. 1B are schematic diagrams showing the installation and factory calibration of the GNSS receiver according to the traditional surveying and mapping method.
Figure 1B:
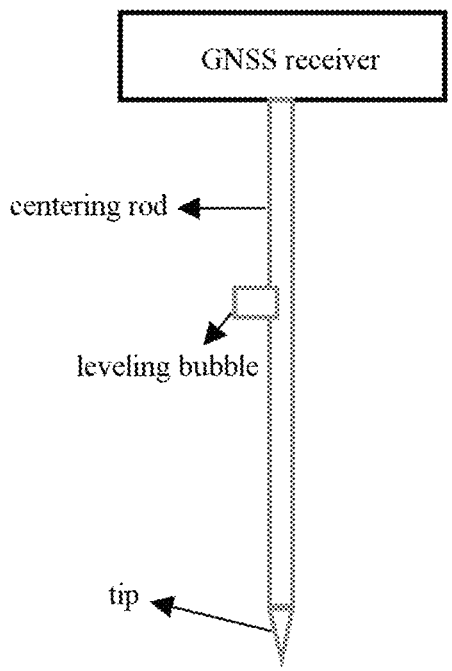

The technical solutions in the embodiments of the present invention are described clearly and completely below with reference to the drawings in the embodiments of the present invention. Obviously, the described embodiments are a part, not all, of the embodiments of the present invention. Based on the embodiments of the present invention, all other embodiments obtained by those having ordinary skill in the art without any creative effort shall fall within the scope of protection of the present invention.

In the description of the present invention, it should be explained that the terms "upper/above", "lower/under", "inner/inside/interior", "outer/outside/external", "front end", "rear end", "two ends/both ends", "one/an end", "the other end" and the like indicating the directional or positional relationships are based on the directional or positional relationships shown in the drawings, and are merely used to facilitate description, rather than indicating or implying that the device or element must have a specific orientation, or be configured and operated in a specific orientation, and therefore cannot be construed as a limitation to the present invention. In addition, the terms "first" and "second" are only used for descriptive purposes, and cannot be construed as indicating or implying relative importance.

In the description of the present invention, it should be explained that in the description of the present invention, unless otherwise clearly defined and limited, the terms "installed", "be provided with", and "connected" should be interpreted in a broad sense. For example, with respect to "connection", it can be a fixed connection, a detachable connection, or an integral connection; it can be a mechanical connection or an electrical connection; it can be a direct connection, or an indirect connection through an intermediate medium, and it can be the internal communication between two components. For those having ordinary skill in the art, the specific meaning of the above-mentioned terms in the present invention can be understood according to specific implementations.

Referring to FIGS. 1C-FIG. 6, the present invention provides a GNSS/IMU surveying and mapping system, including: a GNSS/IMU receiver, a relative position transfer medium, and a display terminal. The GNSS/IMU receiver at least includes a GNSS antenna, a GNSS positioning board, an IMU inertial sensor and a position transfer device. The GNSS antenna is configured to track and receive an electromagnetic wave signal transmitted by a navigation positioning satellite. The GNSS positioning board is configured to analyze the electromagnetic wave signal received by the GNSS antenna and execute a satellite navigation positioning program to calculate the coordinates of the phase center of the GNSS antenna and use the coordinates of the phase center as reference coordinates for measuring a relative position point.

Figure 1C:
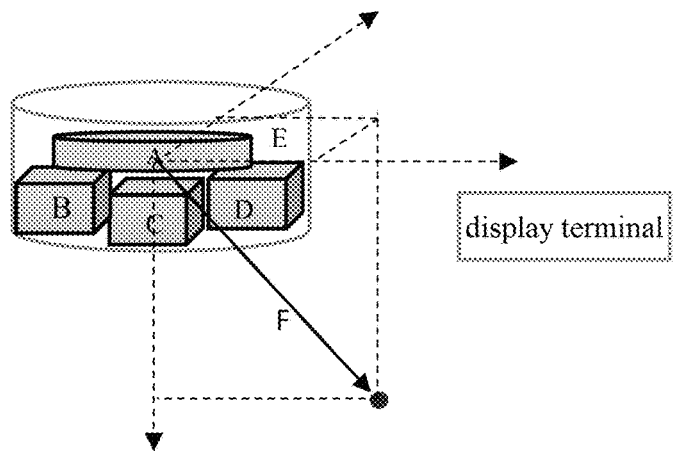
FIG. 1C is a schematic diagram of the system structure of the GNSS/IMU receiver according to the present invention.
Figure 2:
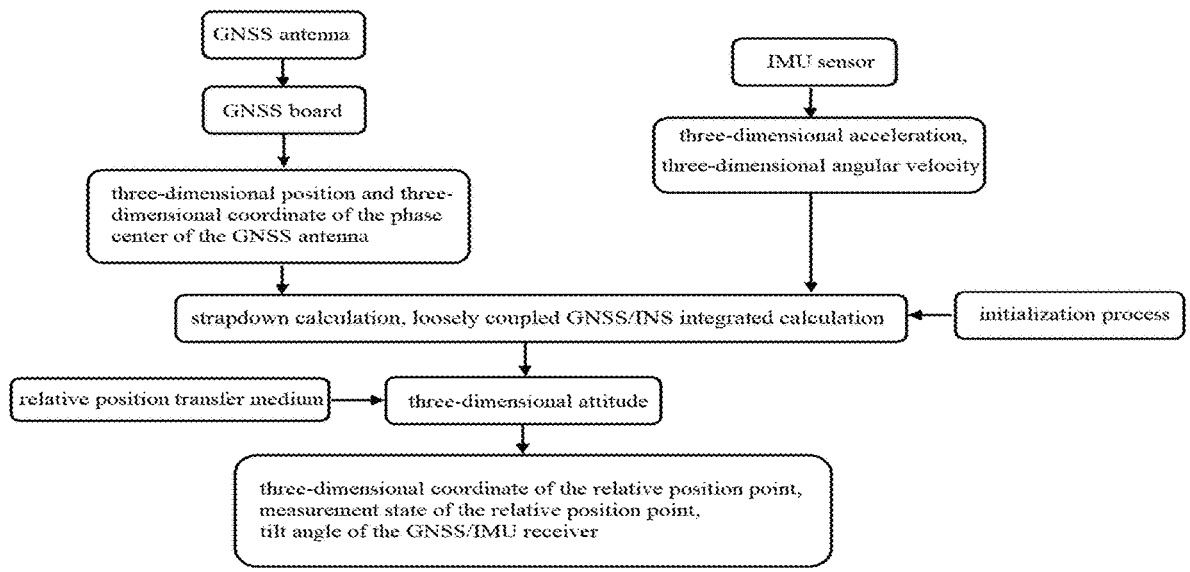
FIG. 2 is a flowchart of the data processing of the measurement function of the relative position point.
Figure 3:
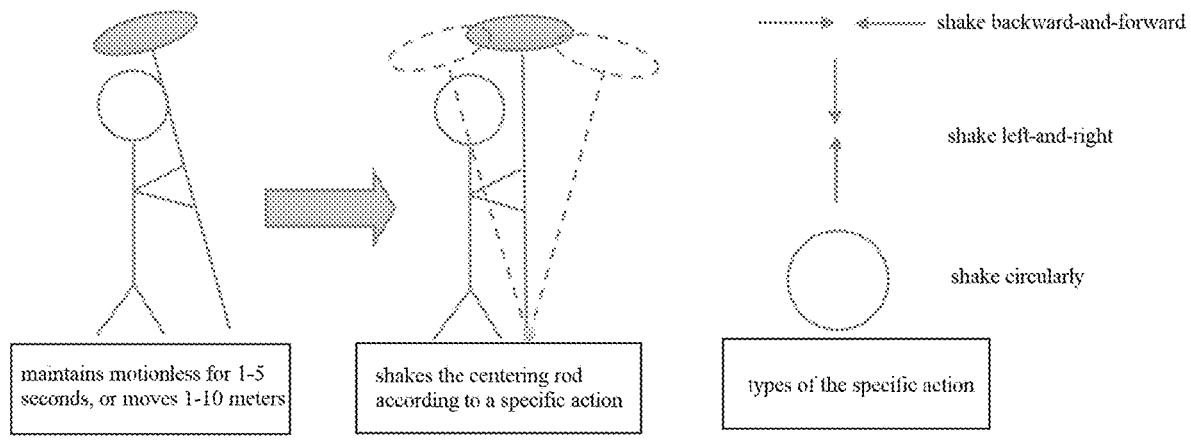
FIG. 3 illustrates the initialization process of the measurement function of the relative position point.
Figure 4:
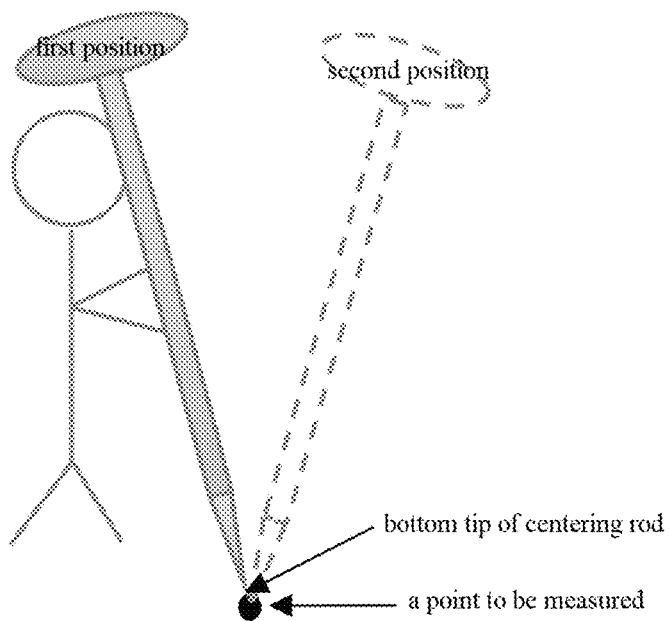
FIG. 4 illustrates the measurement process of the measurement function of the relative position point.
Figure 5:
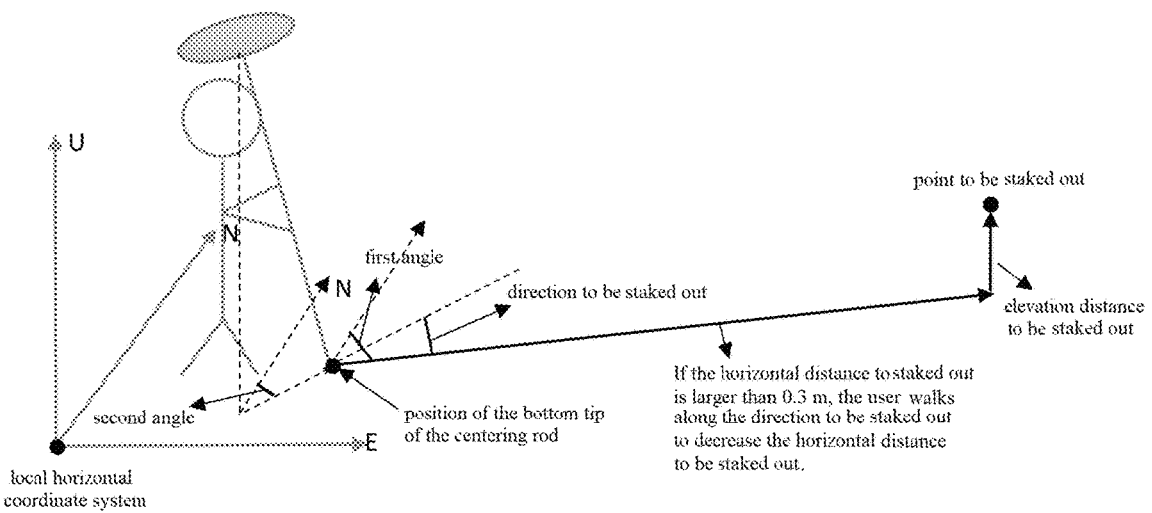
FIG. 5 illustrates the point finding process of the stakeout function.
Figure 6A:
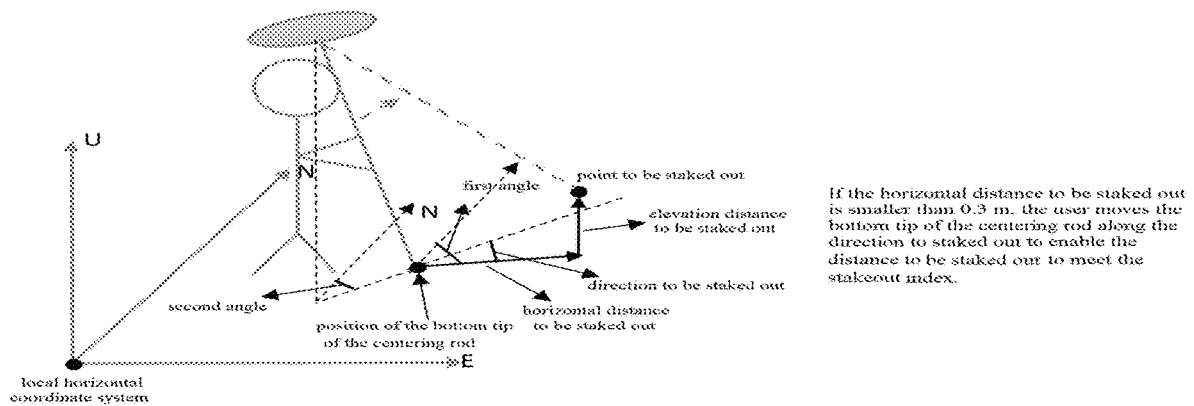
FIG. 6A and FIG. 6B illustrate the stakeout process of the stakeout function.
Figure 6B:
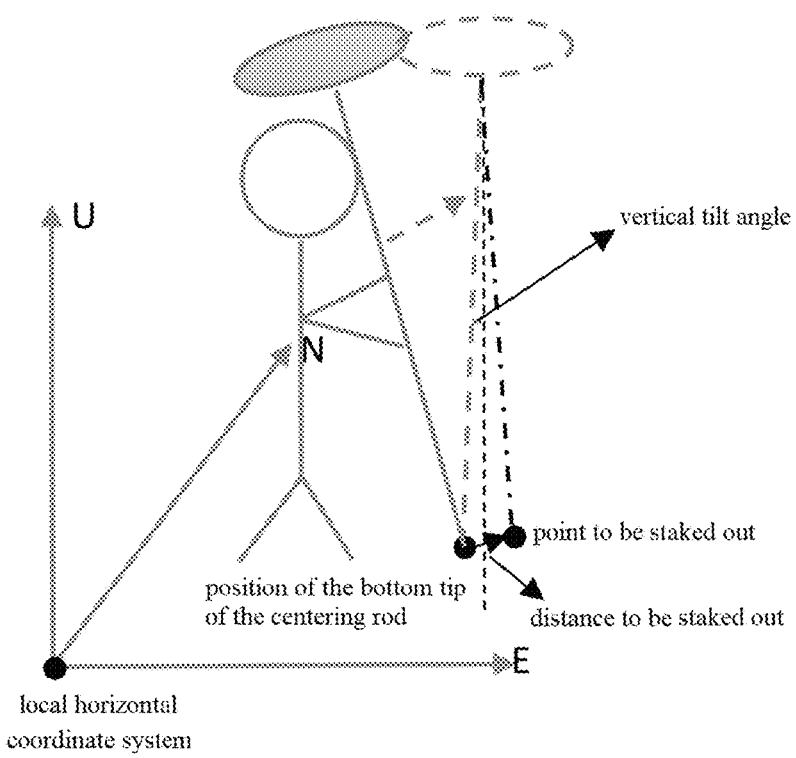

As shown in FIG. 1C, the letter A represents a GNSS antenna, which is configured to track and receive an electromagnetic wave signal transmitted by a navigation positioning satellite. The letter B represents a GNSS positioning board, which is configured to process the electromagnetic wave signal received by the GNSS antenna, execute a satellite navigation positioning calculating program and output the satellite navigation positioning result. The letter C represents an IMU inertial sensor, which is configured to measure a three-dimensional inertial angular velocity and a three-dimensional inertial acceleration of the GNSS/IMU receiver. The letter D represents a position transfer device, which is configured to receive the satellite navigation positioning information and the observation information of the IMU inertial sensor output by the GNSS board, and execute the inertial strapdown calculation, the loosely coupled GNSS/INS integrated algorithm, the relative position point transfer algorithm and others. The letter E represents a GNSS/IMU receiver, which includes the GNSS antenna, the GNSS board, the IMU inertial sensor and the position transfer device. The letter F represents a relative position transfer medium, which is a three-dimensional coordinate vector, namely a three-dimensional projection coordinate vector of the relative position point in a body coordinate system. The display terminal is configured to display the measurement result and the measurement state of the relative position point and interact with the user, thus improving the working efficiency.

In the present invention, the IMU inertial sensor is configured to measure a three-axis linear acceleration and a three-axis angular velocity of the GNSS/IMU receiver in an inertial space. The IMU inertial sensor is installed inside the GNSS/IMU receiver according to a defined spatial relation, and includes a three-axis accelerometer and a three-axis gyroscope. The three axes of the accelerometer are arranged correspondingly parallel to the three axes of the gyroscope. The definition of the axes meets the right-hand rule. The accelerometer and the gyroscope are designed in the form of a micro electro mechanical system (MEMS) and employ an industrial-grade or consumer-grade accelerometer and gyroscope, respectively. The IMU inertial sensor may be fixed on the structural support or PCB inside the GNSS/IMU receiver, and power supply and data transmission are realized by a pin header or cable. Alternatively, the IMU inertial sensor is fixed on the PCB inside the GNSS/INS receiver in a pasting manner, and power supply and data transmission are realized by designing the circuit of the PCB.

The position transfer device is a computer-executable program and configured to calculate the three-dimensional coordinate position of the relative position point of the GNSS/IMU receiver, the tilt angle of the GNSS/IMU receiver and the measurement state of the relative position point, and control the GNSS/IMU receiver to feed back the measurement result and the measurement state of the relative position point through sound or light. The position transfer device is configured to acquire the positioning data of the GNSS board and the observation data of the IMU, calculate the pitch angle, the roll angle and the heading angle of the GNSS/IMU receiver through a GNSS/INS integrated navigation algorithm, use the pitch angle, the roll angle and the heading angle of the GNSS/IMU receiver as the reference three-dimensional attitude, calculate the three-dimensional coordinates of the relative position point to be measured through the reference coordinates, the reference attitude, and the position transfer vector defined by the position transfer medium, calculate the vertical tilt angle and the directional tilt angle of the GNSS/IMU receiver relative to the local horizontal coordinate system through the reference attitude to obtain the tilt angle, output the reference coordinates, the reference three-dimensional attitude, the position transfer vector, the three-dimensional coordinates of the relative position point to be measured, the tilt angle, and the related state of the measurement function of the relative position point, and control the GNSS/IMU receiver to feed back the result and related state of the measurement function of the relative position point in the form of sound or light. The three-dimensional coordinates of the relative position point to be measured, the tilt angle, and the related state of the measurement function of the relative position point are the required output, and the remaining data are the optional output. The tilt angle includes the vertical tilt angle and the directional tilt angle. According to the definition of the coordinate axes defined by the IMU, the vertical tilt angle represents the angle (0-180°) between the Z axis of the IMU and the plumb line, wherein the Z axis generally refers to the direction in which the middle finger points in the right-handed coordinate system, and the directional tilt angle represents the angle (±180°) between a plane and the true north direction, wherein the plane is formed by the Z axis of IMU and the plumb line.

In the present invention, the relative position transfer medium is a physical medium for transferring the spatial relation between the phase center of the antenna of the GNSS/IMU receiver and the relative position measurement point, and includes a centering rod, a tripod, an AVG vehicle equipped with a GNSS/IMU receiver, a ferry vehicle, a tractor, a transplanter, a planter, a harvester, a bulldozer, a land leveller, an excavator, a paver, a road roller, a loader, a crane, a drilling machine, a forklift truck, a snow removal vehicle, a sprinkler truck, a sanitation truck, a fire engine, an unmanned aerial vehicle, an unmanned surface vehicle and other carriers. The physical medium can be abstracted into a three-dimensional coordinate vector indicating the defined spatial relation between the relative position point to be measured and the phase center of the antenna of the GNSS/IMU receiver. A Cartesian coordinate system with the origin in the phase center of the GNSS antenna is defined as the body coordinate system, wherein the definition of directions of the coordinate axes of the Cartesian coordinate system is the same as the definition of directions of the coordinate axes of the IMU inertial sensor. The relative position transfer medium indicates the three-dimensional coordinate vector of the space vector of the relative position point to be measured relative to the phase center of the GNSS antenna in the body coordinate system. Since the user cannot directly contact the phase center of the GNSS antenna located inside the GNSS/IMU receiver, the phase center of the GNSS antenna needs to connect to the external point of the GNSS/IMU receiver. Therefore, the defined spatial relation at least includes two parts. If the installation surface center of the GNSS/IMU receiver is selected as the external connection point, then the three-dimensional coordinate vector of the space vector of the installation surface center relative to the phase center of the GNSS antenna in the body coordinate system is defined as the first three-dimensional vector, and the first three-dimensional vector is a constant value and stored in a memory of the GNSS/IMU receiver. After the origin of the body coordinate system is translated to the installation surface center, a connection coordinate system is obtained. The three-dimensional coordinate vector of the space vector of the relative position point to be measured relative to the installation surface center in the connection coordinate system is defined as the second three-dimensional vector, and the second three-dimensional vector is set by the user. The three-dimensional vector defined by the abstracted relative position transfer physical medium includes the first three-dimensional vector and the second three-dimensional vector and is used as the position transfer vector. The installation surface center of the GNSS/IMU receiver is one implementation of the external connection point, and the connection point may be any one contactable point that is located on the exterior of the GNSS/IMU receiver and fixed relative to the GNSS/IMU receiver.

In the present invention, the display terminal is configured to display the measurement result and the measurement state of the relative position point of the GNSS/IMU receiver and interact with the user. The display terminal is an optional device of the GNSS/IMU surveying and mapping system and does not affect the implementation of the measurement function of the relative position point of the GNSS/IMU receiver.

The present invention further provides a surveying and mapping method for implementing the measurement function of the relative position point by using a centering rod. The surveying and mapping method at least includes the initialization process of the measurement function of the relative position point and the measurement process of the relative position point.

Specifically, the initialization process of the measurement function of the relative position point at least includes the following two steps. Step 1: the second three-dimensional vector of the relative position point to be measured relative to the external connection point is set, wherein, in the surveying and mapping method, the external connection point is the installation surface center of the GNSS/IMU receiver, the relative position point to be measured is the bottom tip of the centering rod, and the second three-dimensional vector is the three-dimensional coordinates of the vector length from the top center of the centering rod to the bottom tip of the centering rod in the connection coordinate system. Step 2: the reference attitude is initialized through a specific operation action to obtain the initial attitude value of the GNS SANS integrated navigation algorithm, and then the GNS SANS integrated navigation filtering calculation is performed. The order of step 1 and step 2 can be reversed. The specific operation action for the initialization includes the following two alternatives. The first alternative is as follows: the centering rod maintains in-situ motionless for a period of time, and then is repeatedly shaken backward-and-forward, or left-and-right, or backward-forward-and-left-right, or circularly clockwise, or circularly counterclockwise until the GNSS/IMU receiver or the display terminal prompts that the initialization process is completed. The second alternative is as follows: the centering rod is held by hand or carried on the shoulder and moved a specific distance, and then is repeatedly shaken backward-and-forward, or left-and-right, or backward-forward-and-left-right, or circularly clockwise, or circularly counterclockwise until the GNSS/IMU receiver or the display terminal prompts that the initialization process is completed. The operations of shaking the centering rod can be any combination of backward-and-forward shaking, left-and-right shaking and circular motion. The motionless time is set to 1-5 seconds, the movement distance is set to 1-10 meters, and the number of repeated shaking operations is set to 1-10. The length of the motionless time, the length of the movement distance, and the order of performing a combination of shaking operations and the number of the repeated shaking operations do not affect the implementation of the initialization process.

Specifically, the measurement process of the relative position point at least includes the following two steps. Step 1: the bottom tip of the centering rod is placed on a point to be measured to connect the relative position point and the point to be measured, wherein, the user holds the centering rod by the hand or carries the centering rod on the shoulder, and the range of the vertical tilt angle of the GNSS/IMU receiver is maintained to be 0-90°. Different from the traditional surveying and mapping method for implementing the measurement function of the relative position point by using a centering rod, the method of the present invention eliminates the process of keeping the leveling bubble on the centering rod centered since it does not require the vertical tilt angle of the receiver to be 0° or approach 0°, which significantly reduces the limitation on the measurement. Step 2: the acquisition command is triggered to acquire the three-dimensional coordinates of the relative position point. The method of acquiring the coordinates of the relative location point includes single position acquisition and multiple position acquisition. The single position acquisition is as follows: After the user issues the acquisition command through button or sound, the display terminal or the receiver saves the three-dimensional coordinates of the first relative position measurement point, and takes the three-dimensional coordinates of the first relative position measurement point as the measurement result, wherein the three-dimensional coordinates of the first relative position measurement point are output by the position transfer device after receiving the command. Alternatively, after the user issues the acquisition command through button or sound, the display terminal or the receiver saves the three-dimensional coordinates of the multiple consecutive relative position measurement points and takes the average of the three-dimensional coordinates of the multiple consecutive relative position measurement points as the measurement result, wherein the three-dimensional coordinates of the multiple consecutive relative position measurement points are output by the position transfer device after receiving the command. The multiple position acquisition is as follows: After the user issues the acquisition command through button or sound, the display terminal or the receiver saves and takes the three-dimensional coordinates of the first relative position measurement point or the average of the three-dimensional coordinates of the multiple consecutive relative position measurement points as the measurement value of a first position, wherein the three-dimensional coordinates of the first relative position measurement point and the three-dimensional coordinates of the multiple consecutive relative position measurement points are output by the position transfer device after receiving the command. The bottom tip of the centering rod is maintained placed on the point to be measured, and the centering rod is moved to a second position. After the user again issues the acquisition command through button or sound, the display terminal or the receiver saves and takes the three-dimensional coordinates of the first relative position measurement point or the average of the three-dimensional coordinates of the multiple consecutive relative position measurement points as the measurement value of the second position, wherein the three-dimensional coordinates of the first relative position measurement point and the three-dimensional coordinates of the multiple consecutive relative position measurement points are output by the position transfer device after receiving the command. The above operations are repeatedly performed to acquire the measurement values of multiple positions, and the average of the measurement values is taken as the measurement result. During the process of acquiring the three-dimensional coordinates of the point to be measured, the centering rod is held by the hand or carried on the shoulder, and the range of the vertical tilt angle of the GNSS/IMU receiver is maintained to be 0-90°. The number of the measurement points with measurement values to be averaged and the number of the multiple positions do not affect the implementation of the data acquisition process. During the measurement of the multiple positions, the bottom tip of the centering rod is allowed to deviate from the measurement point in the process of switching the position of the centering rod, and the bottom tip of the centering rod is placed at an identical point to be measured in the process of triggering the acquisition command and the process of acquiring the data.

The present invention further provides a surveying and mapping method for implementing the stakeout function by using the measurement function of the relative position point. The method includes:

Step (1): The display terminal receives, in real time, the three-dimensional coordinate information of the relative position point of the bottom tip of the centering rod and the tilt angle information of the GNSS/IMU receiver output by the position transfer device.

Step (2): Calculation of the distance to be staked out: the three-dimensional coordinate vector between the bottom tip of the centering rod and a point to be staked out is calculated according to the three-dimensional coordinates of the bottom tip of the centering rod and the three-dimensional coordinates of the point to be staked out, and the three-dimensional coordinate vector is projected on the local horizontal coordinate system; the sum of the vectors of the projection in the horizontal direction is the horizontal distance to be staked out, and the component of the projection in the elevation direction is the elevation distance to be staked out; and the horizontal distance to be staked out and the elevation distance to be staked out jointly constitute the distance to be staked out.

Step (3): Calculation of the direction to be staked out: based on the projection of the three-dimensional coordinate vector between the bottom tip of the centering rod and the point to be staked out on the local horizontal coordinate system, the angle between the projection and the true north direction is calculated and defined as the first direction angle; the directional tilt angle of the GNSS/IMU receiver received by the display terminal in real time is defined as the second direction angle; and the difference between the first direction angle and the second direction angle indicates the direction to be staked out.

Step (4): The display terminal prompts the distance to be staked out and the direction to be staked out through a software interface or sound to guide the user to perform the stakeout operation. The stakeout operation includes a point finding process and a stakeout process according to the distance to be staked out. When the distance to be staked out is larger than a threshold, the point finding process is performed as follows: the user holds the centering rod by the hand or carries the centering rod on the shoulder and maintains the range of the vertical tilt angle of the GNSS/IMU receiver to be 0-90°, and then the user moves along the direction to be staked out as prompted by the display terminal to decrease the horizontal distance to be staked out as prompted by the display terminal until the horizontal distance to be staked out as prompted by the display terminal is smaller than the stakeout distance threshold for entering the stakeout process. The stakeout process includes a rough stakeout process and a fine stakeout process according to the stakeout accuracy requirement. The rough stakeout process is as follows: the user holds the centering rod by the hand or carries the centering rod on the shoulder and moves the bottom tip of the centering rod along the direction to be staked out as prompted by the display terminal until the horizontal distance to be staked out and the elevation distance to be staked out as prompted by the display terminal both meet the stakeout accuracy requirement. The fine stakeout process is as follows: on the basis of the rough stakeout process, the user keeps the position of the bottom tip of the centering rod unchanged, holds the centering rod by the hand or carries the centering rod on the shoulder, and moves the centering rod to make the vertical tilt angle of the GNSS/IMU receiver smaller than 10°, that is, the centering rod is nearly vertical. If the horizontal distance to be staked out and the elevation distance to be staked out as prompted by the display terminal still meet the stakeout accuracy requirement, then the stakeout process is completed. If the horizontal distance to be staked out and the elevation distance to be staked out do not meet the stakeout accuracy requirement, then the bottom tip of the centering rod is slightly moved in the direction to be staked out as prompted by the display terminal until the horizontal distance to be staked out and the elevation distance to be staked out meet the stakeout accuracy requirement to complete the stakeout process. When the stakeout accuracy requirement is high, the fine stakeout process is performed to ensure that the stakeout accuracy meets the requirements. The fine stakeout process does not affect the stakeout function of the GNSS/IMU receiver.

Step (5): When the distance to be staked out as prompted by the display terminal meets the stakeout accuracy index requirement, the position coordinates of the bottom tip of the centering rod are determined as the position coordinates of the point to be staked out.

Referring to FIGS. 1C-6B, the principle and method of the present invention for measuring the relative position point of the GNSS/IMU receiver are described briefly below.

Step 1: the GNSS positioning data and the IMU observation data are acquired synchronously.

After the GNSS antenna tracks and receives the satellite signal, the observation information of the GNSS antenna and other related calculation information such as differential signals are transmitted to the GNSS positioning board. The GNSS board performs the satellite navigation positioning algorithm according to the observation information and the calculation information and outputs the calculating time, the velocity of the phase center of the GNSS antenna, and the position information of the phase center of the GNSS antenna. Meanwhile, the position transfer device is controlled by a CPU to periodically acquire the three-axis acceleration and the three-axis angular velocity observed by the IMU inertial sensor at a sampling frequency that is generally 100 Hz, and simultaneously acquire the pulse per second (PPS) signal of the GNSS board and the GNSS time information. The time information of the CPU is synchronized based on the GNSS time information for time synchronization of the observation information of the IMU with the calculation information of the GNSS board. The observation information of the IMU and the positioning information of the GNSS board after the synchronization are transmitted to the calculating module of the position transfer device.

Step 2: the relative position transfer medium is set.

The user uses a steel ruler to measure the three-dimensional projection coordinates of the vector of the relative position point relative to the external connection point of the GNSS/IMU receiver in the connection coordinate system, and the resulting measurement value is transferred to the position transfer device through the display terminal or the GNSS/IMU receiver, that is, the second three-dimensional vector is set. The position transfer device reads the first three-dimensional vector from the memory after receiving the second three-dimensional vector, and the first three-dimensional vector is added to the second three-dimensional vector to obtain the relative position transfer medium. In the application of surveying and mapping with the aid of the centering rod, the vector length of the first three-dimensional vector can be read directly from the centering rod. In general, the projections of the first three-dimensional vector on the X axis and Y axis of the connection coordinate system are 0, and the projection of the first three-dimensional vector on the Z axis of the connection coordinate system is the vector length of the first three-dimensional vector.

Step 3: the measurement function of the relative position point is initialized.

The inertial navigation positioning algorithm belongs to a dead reckoning algorithm. The initial values of the algorithm, including the initial attitude, the initial velocity and the initial position need to be determined. The initial velocity and the initial position are determined through the velocity and the position output by the GNSS board. The initial pitch angle and the initial roll angle are determined through the acceleration measured by the IMU inertial sensor. Only the initial heading is determined by a special method. The measurement function of the relative position point of the GNSS/IMU receiver cooperates with a large misalignment angle initialization algorithm through specific operations to determine the initial heading. After turning on the measurement function of the relative position point through the display terminal or the GNSS/IMU receiver, the user maintains the GNSS/IMU receiver motionless for a period of time or holds the GNSS/IMU receiver by the hand and moves a specific distance, and then the GNSS/IMU receiver is shaken according to specific operation actions. For example, the GNSS/IMU receiver is shaken repeatedly backward-and-forward, or the GNSS/IMU receiver is shaken repeatedly left-and-right, or the GNSS/IMU receiver is driven to repeatedly perform a circular motion. The position transfer device calculates the initial heading by processing the navigation positioning information of the GNSS board and the observation information of the IMU inertial sensor received during the specific operation action to initialize the inertial navigation positioning algorithm. Then, the inertial navigation positioning calculation and the loosely coupled GNSS/INS integrated calculation are executed.

Step 4: loosely coupled GNSS/INS integrated calculation.

After the measurement function of the relative position point is initialized, that is, the inertial navigation positioning algorithm is initialized, the relative position transfer device performs the inertial navigation positioning calculation at a frequency not higher than the sampling frequency of the IMU inertial sensor according to the inertial navigation mechanization algorithm, and outputs the three-dimensional attitude, the three-dimensional velocity and the three-dimensional position calculated by the inertial navigation, which are defined as the first attitude, the first velocity and the first position, respectively. Meanwhile, the relative position transfer device constructs the Kalman filter model of the loosely coupled GNSS/INS integrated calculation according to the differential equation of the inertial navigation mechanization algorithm, and updates the time of the Kalman filter at a frequency identical to the frequency of performing the inertial navigation positioning calculation. When the relative position transfer device receives the three-dimensional velocity and the three-dimensional position output by the GNSS board, the three-dimensional velocity and the three-dimensional position are defined as the second velocity and the second position, respectively. The difference between the first position and the second position and the difference between the first velocity and the second velocity are used as the observations of the filter to update the measurement information of the Kalman filter. The error of the first position, the error of the first velocity, the error of the first attitude and the zero-offset error of the IMU inertia sensor are estimated, and the error estimated by the filter is fed back and corrected to the first position, the first velocity and the first attitude calculated by the inertial navigation positioning, and the zero-offset value of the IMU inertia sensor. The corrected first position, first velocity and first attitude are used as the results of the loosely coupled GNSS/INS integrated calculation and output. In this way, one loosely coupled GNSS/INS integrated calculation is completed. The relative position transfer device cyclically executes the above process to dynamically track the three-dimensional attitude, velocity and position of the GNSS/IMU receiver with high accuracy.

Step 5: the three-dimensional coordinates of the relative position point are calculated.

The position of the phase center of the GNSS antenna output by the GNSS board is the Cartesian position or curve position in the earth-centered earth-fixed (ECEF) coordinate system. The three-dimensional attitude output by the relative position transfer device indicates the rotation relationship of the body coordinate system relative to the navigation coordinate system (the local horizontal coordinate system). The conversion relationship between the ECEF coordinate system and the navigation coordinate system is a function of the position of the phase center of the GNSS antenna, which is a known quantity. The relative position transfer medium is the three-dimensional coordinate vector that is defined in the body coordinate system and describes the spatial relation of the relative position point relative to the phase center of the GNSS antenna in the body coordinate system. Therefore, the three-dimensional attitude is a link that transfers the three-dimensional coordinate vector in the body coordinate system to the ECEF coordinate system. After the projection coordinates of the relative position transfer medium in the ECEF coordinate system are obtained, the three-dimensional position of the relative position point in the ECEF coordinate system can be obtained through the translation relation of the three-dimensional vector, thereby measuring the relative position point. The above process can be expressed by the following formulas:

$$R_{measurement} = R_{antenna} + C_b^n * lever_b,$$

wherein, $R_{measurement}$ represents the three-dimensional coordinates of the relative position point in the ECEF coordinate system;

$R_{antenna}$ represents the three-dimensional coordinates of the phase center of the GNSS antenna in the ECEF coordinate system;

$C_b^n$ is a direction cosine matrix determined according to the three-dimensional attitude output by the position transfer device, and represents the rotation relationship of the body coordinate system relative to the navigation coordinate system; and $lever_b$ represents the relative position transfer medium in the body coordinate system.

Step 6: the tilt angle of the GNSS/IMU receiver is calculated.

The relative position transfer device calculates the vertical tilt angle and the directional tilt angle of the GNSS/IMU receiver in the local horizontal coordinate system according to the obtained three-dimensional attitude, so that the GNSS/IMU receiver or the display terminal can intuitively prompt the current spatial state of the GNSS/IMU receiver, and guide the user to perform the measurement operation.

As described above, the present invention, the IMU inertial sensor is integrated inside the traditional GNSS receiver, and the inertial navigation positioning result is combined with the satellite navigation positioning result by a Kalman filter, which makes the respective advantages of the inertial navigation positioning and the satellite navigation positioning complementary to each other. The present invention takes full advantage of the high accuracy of the satellite navigation positioning and the high dynamic and full autonomy of the inertial navigation positioning to realize high-precision and high-reliability dynamic tracking of the three-dimensional attitude of the GNSS/IMU receiver. On this basis, the measurement function of the relative position point of the GNSS/IMU receiver is realized, which eliminates the process of centering the leveling bubble and reduces the labor intensity of the user while greatly improving the measurement efficiency. The calculated result obtained through the mechanization of the inertial navigation system and the calculated result obtained through the GNSS are integrated by the Kalman filter. The attitude error, the velocity error and the position error produced from the mechanization, and the residual zero-offset error produced from the inertia sensor are estimated and corrected through feedback, thereby accomplishing high-frequency and high-precision dynamic tracking calculation of the three-dimensional attitude. No magnetometer is adopted in the present invention, which fundamentally avoids the problem of poor reliability caused by the correction of the magnetometer and the interference of the electromagnetic environment. Since the motion state is modeled completely, a change in the motion state of the GNSS receiver does not affect the tracking of the three-dimensional attitude. Thus, the present invention can track the three-dimensional attitude with high accuracy and high dynamic, and the relative position point is measured in real time based on the three-dimensional attitude without requiring the quasi static condition. The present invention fully utilizes the velocity and position information of the GNSS to initialize the states of the loosely coupled GNSS/INS integrated calculation, including the three-dimensional position, the three-dimensional velocity and the three-dimensional attitude. The initial value of the three-dimensional position and the initial value of the three-dimensional velocity can be obtained through the GNSS receiver. The initial value of the pitch angle and the initial value of the roll angle can be obtained through the measurement information of the accelerometer. The key is to obtain the initial value of the heading angle. The initial value of the heading angle of the loosely coupled GNSS/INS integrated calculation is essentially an angle between the coordinate axis of the inertial sensor and the true north direction. The traditional loosely coupled GNSS/INS integrated algorithm model cannot satisfy the linearization condition since the GNSS/IMU receiver is not fixedly installed and the angle between the coordinate axis of the inertial sensor and the true north direction is arbitrary and unfixed at the initial moment. In this regard, in the present invention, the state quantity of the Kalman filter is reconstructed to linearize the nonlinear model (Method For Estimating Initial Heading Of Carrier Based On Transformation Estimator Modeling Scheme, CN 109764870A). In this way, the user only needs to hold the GNSS/IMU receiver and operates it according to specific actions for a specific time, so that the initial value of the heading angle satisfying a small angle error required by the loosely coupled GNSS/INS integrated algorithm model is estimated under the condition of an arbitrary initial value of the heading angle, and then the loosely coupled GNSS/INS integrated calculation is performed to realize the high-precision and high-dynamic tracking of the three-dimensional attitude. In the present invention, the measurement function of the relative position point is initialized only by a specific operation as follows: the user holds the GNSS/IMU receiver by the hand and keeps the GNSS/IMU receiver motionless for a period of time or moves the GNSS/IMU receiver by a distance, and then shakes the receiver to complete the initialization. This operation action is easy, so that the user can complete it generally within 10 seconds, which hardly affects the normal measurement operation process. In the present invention, the stakeout function is realized by a specific operation. The traditional stakeout method determines the direction to be staked out based on the magnetometer on the display terminal, which has poor accuracy and reliability. Especially, after arriving near the point to be staked out, due to the spatial inconsistency between the display terminal and the GNSS receiver, the direction to be staked out on the display terminal has no reference significance, which provides a poor experience for the user. In addition, after arriving near the point to be staked out, the leveling bubble on the centering rod is necessarily centered to realize accurate stakeout, which has low efficiency and large labor intensity. In the present invention, the tilt angle of the GNSS/IMU receiver itself is calculated, which has high accuracy and high reliability. After arriving near the point to be staked out, only the bottom tip of the centering rod is moved to complete the stakeout, which is simple and convenient to operate, thereby greatly improving the stakeout efficiency, and reducing the labor intensity of the user.

For those skilled in the art, it is apparent that the present invention is not limited to the details of the foregoing exemplary embodiments, and the present invention can be implemented in other specific forms without departing from the spirit or basic characteristics of the present invention. Therefore, from any point of view, the embodiments should be regarded as exemplary and non-restrictive. The scope of the present invention is defined by the appended claims rather than the foregoing description, and therefore is intended to include all changes that fall within the meaning and scope of equivalent elements of the claims of the present invention. Any reference signs in the claims should not be construed as a limitation to the related claims.

What is claimed is:

1. A GNSS/IMU surveying and mapping system, comprising a GNSS/IMU receiver, a relative position transfer medium and a display terminal;
   wherein, the GNSS/IMU receiver comprises a GNSS antenna, a GNSS positioning board, an IMU inertial sensor and a position transfer device;
   wherein, the IMU inertial sensor comprises a three-axis accelerometer and a three-axis gyroscope; three axes of the three-axis accelerometer are arranged correspondingly parallel to three axes of the three-axis gyroscope; the IMU inertial sensor is fixed on a structural support or a PCB, wherein the structural support or the PCB are located inside the GNSS/IMU receiver;
   wherein, the relative position transfer medium is a physical medium configured to transfer a spatial relation between a phase center of the GNSS antenna of the GNSS/IMU receiver and a relative position point to be measured; the relative position transfer medium comprises a centering rod, a tripod and a carrier, and the relative position transfer medium is configured to represent a defined spatial relation between the relative position point to be measured and the phase center of the GNSS antenna of the GNSS/IMU receiver; and
   wherein, the GNSS antenna is configured to track and receive an electromagnetic wave signal transmitted by a navigation positioning satellite; the GNSS positioning board is configured to analyze the electromagnetic wave signal received by the GNSS antenna and execute a satellite navigation positioning program to calculate coordinates of the phase center of the GNSS antenna and use the coordinates of the phase center as reference coordinates for measuring the relative position point.

2. The GNSS/IMU surveying and mapping system according to claim 1, wherein, the IMU inertial sensor is configured to measure a three-axis linear acceleration and a three-axis angular velocity of the GNSS/IMU receiver in an inertial space.

3. The GNSS/IMU surveying and mapping system according to claim 2, wherein, the position transfer device is configured to calculate three-dimensional coordinates of the relative position point of the GNSS/IMU receiver, a tilt angle of the GNSS/IMU receiver and a measurement state of the relative position point, and control the GNSS/IMU receiver to feed back a measurement result and the measurement state of the relative position point through sound or light.

4. A GNSS/IMU surveying and mapping method adopting the GNSS/IMU surveying and mapping system of claim 1, comprising an initialization process of a measurement function of a relative position point and a measurement process of the relative position point.

5. The GNSS/IMU surveying and mapping method according to claim 4, wherein, the initialization process of the measurement function of the relative position point comprises:
   setting a three-dimensional vector of the relative position point to be measured relative to an external connection point, wherein, the external connection point is an installation surface center of the GNSS/IMU receiver, the relative position point to be measured is a bottom tip of a centering rod, and the three-dimensional vector is three-dimensional coordinates of a vector length from a top center of the centering rod to the bottom tip of the centering rod in a connection coordinate system;
   initializing a reference attitude through an operation action to obtain an initial attitude value of a GNS SANS integrated navigation algorithm;
   wherein, an order of setting the three-dimensional vector and initializing the reference attitude through the operation action is allowed to be reversed;
   wherein, the operation action for the initialization comprises:
      (1) maintaining the centering rod in-situ motionless for a period of time, and then repeatedly shaking the centering rod backward-and-forward, or left-and-right, or backward-forward-and-left-right, or circularly clockwise, or circularly counterclockwise until the GNSS/IMU receiver or the display terminal prompts that the initialization process is completed;
      alternatively, (2) holding the centering rod by a hand or carry the centering rod on a shoulder and moving the centering rod a specific distance, and then repeatedly shaking the centering rod backward-and-forward, or left-and-right, or backward-forward-and-left-right, or circularly clockwise, or circularly counterclockwise until the GNSS/IMU receiver or the display terminal prompts that the initialization process is completed;
   wherein, operations of shaking the centering rod are any combination of backward-and-forward shaking, left-and-right shaking and circular motion; a motionless time is set to 1-5 seconds, a movement distance is set to 1-10 meters, and a number of repeated shaking operations is set to 1-10; a length of the motionless time, a length of the movement distance, an order of performing a combination of shaking operations, and the number of the repeated shaking operations do not affect an implementation of the initialization process.

6. The GNSS/IMU surveying and mapping method according to claim 5, wherein, the measurement process of the relative position point comprises:
   placing the bottom tip of the centering rod on a point to be measured to connect the relative position point and the point to be measured; and
   triggering an acquisition command to acquire three-dimensional coordinates of the relative position point.

7. The GNSS/IMU surveying and mapping system and method according to claim 5, wherein, the measurement process of the relative position point of the GNSS/IMU receiver specifically comprises:
   step S1: synchronously acquiring GNSS positioning data and IMU observation data;
   step S2: initializing the measurement function of the relative position point;
   step S3: performing a GNSS/INS integrated calculation by a position transfer device, and calculating a three-dimensional attitude of the GNSS/IMU receiver; and
   step S4: calculating three-dimensional coordinates of the relative position point by the position transfer device.

8. A surveying and mapping method for implementing a stakeout function by using a measurement function of a relative position point, comprising:
   step (1): receiving, by a display terminal in real time, three-dimensional coordinate information of the relative position point of a bottom tip of a centering rod and tilt angle information of the GNSS/IMU receiver, wherein the three-dimensional coordinate information of the relative position point of the bottom tip of the centering rod and the tilt angle information of the GNSS/IMU receiver are output by a position transfer device;

step (2): calculation of a distance to be staked out: calculating a three-dimensional coordinate vector between the bottom tip of the centering rod and a point to be staked out according to three-dimensional coordinates of the bottom tip of the centering rod and three-dimensional coordinates of the point to be staked out, and projecting the three-dimensional coordinate vector on the local horizontal coordinate system to obtain a projection; wherein a sum of vectors of the projection in a horizontal direction is a horizontal distance to be staked out, and a component of the projection in an elevation direction is an elevation distance to be staked out; and the horizontal distance to be staked out and the elevation distance to be staked out jointly constitute the distance to be staked out;

step (3): calculation of a direction to be staked out: based on the projection of the three-dimensional coordinate vector between the bottom tip of the centering rod and the point to be staked out on the local horizontal coordinate system, calculating an angle between the projection and a true north direction and defining the angle between the projection and the true north direction as a first direction angle; and defining a directional tilt angle of the GNSS/IMU receiver received by the display terminal in real time as a second direction angle; wherein a difference between the first direction angle and the second direction angle indicates the direction to be staked out;

step (4): prompting the distance to be staked out and the direction to be staked out by the display terminal through a software interface or sound; and step (5): when the distance to be staked out as prompted by the display terminal meets a stakeout accuracy index requirement, determining position coordinates of the bottom tip of the centering rod as position coordinates of the point to be staked out.

9. The surveying and mapping method according to claim 8, wherein, step (4) specifically comprises:

guiding a user to perform a stakeout operation; wherein, the stakeout operation comprises a point finding process and a stakeout process according to the distance to be staked out; when the distance to be staked out is larger than a threshold, in the point finding process, the user holds the centering rod by a hand or carries the centering rod on a shoulder and maintains a range of the vertical tilt angle of the GNSS/IMU receiver to be 0-90°, and then the user moves along the direction to be staked out as prompted by the display terminal to decrease the horizontal distance to be staked out as prompted by the display terminal until the horizontal distance to be staked out as prompted by the display terminal is smaller than the stakeout distance threshold for entering the stakeout process.

10. The surveying and mapping method according to claim 9, wherein, the stakeout process comprises a rough stakeout process and a fine stakeout process according to a stakeout accuracy index requirement;

wherein, in the rough stakeout process, the user holds the centering rod by the hand or carries the centering rod on the shoulder and moves the bottom tip of the centering rod along the direction to be staked out as prompted by the display terminal until the horizontal distance to be staked out and the elevation distance to be staked out as prompted by the display terminal both meet the stakeout accuracy index requirement;

wherein, in the fine stakeout process, on the basis of the rough stakeout process, the user keeps a position of the bottom tip of the centering rod unchanged, holds the centering rod by the hand or carries the centering rod on the shoulder, and moves the centering rod to make the vertical tilt angle of the GNSS/IMU receiver smaller than 10°; when the horizontal distance to be staked out and the elevation distance to be staked out as prompted by the display terminal meet the stakeout accuracy index requirement, then the stakeout process is completed; when the horizontal distance to be staked out and the elevation distance to be staked out do not meet the stakeout accuracy index requirement, then the bottom tip of the centering rod is slightly moved in the direction to be staked out as prompted by the display terminal until the horizontal distance to be staked out and the elevation distance to be staked out meet the stakeout accuracy index requirement to complete the stakeout process; wherein, the fine stakeout process is performed when the stakeout accuracy index requirement is high.

11. The GNSS/IMU surveying and mapping method according to claim 4, wherein the GNSS/IMU receiver comprises a GNSS antenna, a GNSS positioning board, an IMU inertial sensor and a position transfer device.

12. The GNSS/IMU surveying and mapping method according to claim 11, wherein, the IMU inertial sensor comprises a three-axis accelerometer and a three-axis gyroscope; three axes of the three-axis accelerometer are arranged correspondingly parallel to three axes of the three-axis gyroscope; the IMU inertial sensor is fixed on a structural support or a PCB, wherein the structural support or the PCB are located inside the GNSS/IMU receiver.

13. The GNSS/IMU surveying and mapping method according to claim 12, wherein, the relative position transfer medium is a physical medium configured to transfer a spatial relation between a phase center of the GNSS antenna of the GNSS/IMU receiver and a relative position point to be measured; the relative position transfer medium comprises a centering rod, a tripod and a carrier, and the relative position transfer medium is configured to represent a defined spatial relation between the relative position point to be measured and the phase center of the GNSS antenna of the GNSS/IMU receiver.

14. The GNSS/IMU surveying and mapping method according to claim 13, wherein, the GNSS antenna is configured to track and receive an electromagnetic wave signal transmitted by a navigation positioning satellite; the GNSS positioning board is configured to analyze the electromagnetic wave signal received by the GNSS antenna and execute a satellite navigation positioning program to calculate coordinates of the phase center of the GNSS antenna and use the coordinates of the phase center as reference coordinates for measuring the relative position point.

15. The GNSS/IMU surveying and mapping method according to claim 12, wherein, the IMU inertial sensor is configured to measure a three-axis linear acceleration and a three-axis angular velocity of the GNSS/IMU receiver in an inertial space.

16. The GNSS/IMU surveying and mapping method according to claim 15, wherein, the position transfer device is configured to calculate three-dimensional coordinates of the relative position point of the GNSS/IMU receiver, a tilt angle of the GNSS/IMU receiver and a measurement state of the relative position point, and control the GNSS/IMU receiver to feed back a measurement result and the measurement state of the relative position point through sound or light.

* * * * *